United States Patent
Feurer

(10) Patent No.: US 6,613,269 B1
(45) Date of Patent: Sep. 2, 2003

(54) METHOD AND DEVICE FOR SHAPING HOLLOW BODIES MADE OF THERMOPLASTIC MATERIAL

(75) Inventor: Markus Feurer, Malsch (DE)

(73) Assignee: KR-Porsiplast Verpackungssysteme GmbH, Muggensturm (DE)

( * ) Notice: Subject to any disclaimer, the term of this patent is extended or adjusted under 35 U.S.C. 154(b) by 0 days.

(21) Appl. No.: 10/069,534
(22) PCT Filed: Apr. 5, 2000
(86) PCT No.: PCT/EP00/03012
§ 371 (c)(1),
(2), (4) Date: Oct. 25, 2001
(87) PCT Pub. No.: WO00/64656
PCT Pub. Date: Nov. 2, 2000

(30) Foreign Application Priority Data

Apr. 26, 1999 (DE) .......................... 199 18 783

(51) Int. Cl.⁷ .............................................. B29D 22/00
(52) U.S. Cl. ...................................... 264/570; 264/572
(58) Field of Search ................................. 264/570, 572

(56) References Cited

U.S. PATENT DOCUMENTS

| | | | |
|---|---|---|---|
| 3,523,055 A | * | 8/1970 | Lemelson .................. 428/72 |
| 4,172,749 A | | 10/1979 | Liggett |
| 5,238,725 A | | 8/1993 | Effing et al. |

FOREIGN PATENT DOCUMENTS

| | | |
|---|---|---|
| DE | 2053318 | 5/1972 |
| DE | 2912772 | 7/1980 |
| DE | 196 04 613 A1 | 8/1997 |
| EP | 0135708 | 4/1985 |
| EP | 0558989 | 9/1993 |
| EP | 0646619 | 4/1995 |
| EP | 0649736 | 4/1995 |
| EP | 0778310 | 6/1997 |
| FR | 2208767 | 6/1974 |
| FR | 2607434 | 6/1988 |

* cited by examiner

Primary Examiner—Suzanne E. McDowell
(74) Attorney, Agent, or Firm—Friedrich Kueffner

(57) ABSTRACT

According to the inventive method for shaping hollow bodies made of thermoplastic material which comprise at least one gas pocket (3) having a wall (6), said wall (6) of the gas pocket(s) (3) is externally subjected to the action of pressure in all-over manner, and the hollow body to be shaped is heated when the wall (6) of the gas pocket(s) (3) is being externally subjected to the action of pressure. A device is Configured for carrying out the inventive method. The inventive method or device prevent an undesired deformation or a bursting open of the wall of the gas pocket(s) when heating the hollow body.

7 Claims, 1 Drawing Sheet

METHOD AND DEVICE FOR SHAPING HOLLOW BODIES MADE OF THERMOPLASTIC MATERIAL

Figure 1:
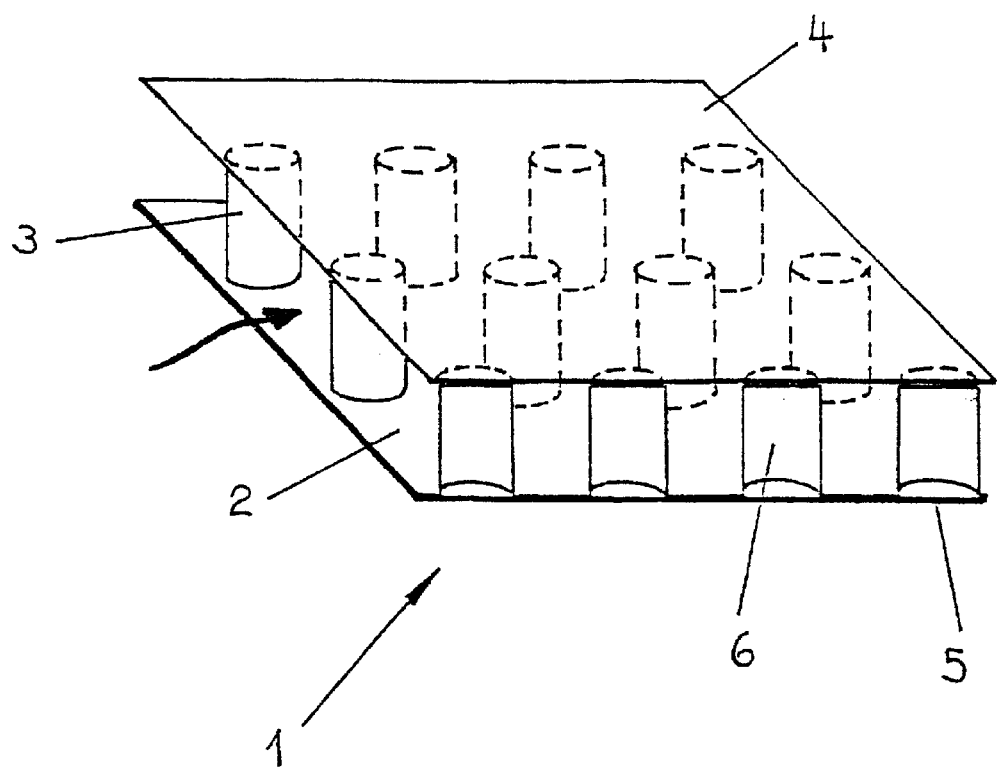

The invention relates to a method for shaping hollow boards of thermoplastic material which have at least one gas pocket having a wall, wherein the hollow board to be shaped is heated.

Known from practical application are methods of the aforementioned kind, with which hollow boards of thermoplastic material of the aforementioned configuration are heated, thereby softened, and, subsequently, shaped in the softened state, for example, by means of deepdrawing devices or presses. Problems result in the case of the conventional methods because of the fact that the medium within the gas pocket or gas pockets is heated together with the hollow board and expands as a result of the increase of its temperature. This expansion is correlated with an undesirable deformation of the wall of the gas pockets up to their bursting.

Prior art methods of a different-type are disclosed in EP 0 646 619 A, EP 0 778 310 A, and EP 0 558, 989 A.

In this connection, EP 0 646 619 A concerns a method for manufacturing shaped parts of foamed polymer particles, wherein in this context the employed polymer particles are to be shaped for adaptation to the employed mold. EP 0 778 310 A describes a method for manufacturing polyolefin foamed particles wherein the pre-foamed particles are further foamed and accordingly also deformed. EP 0 558 989 A finally concerns a method for manufacturing structured surfaces on shaped foam bodies which is directed to dissolve the structure of the foam forming the shaped body in the concerned surface area by treatment with heat and pressure.

It is an object of the invention to eliminate the above disadvantage of the prior art of the aforementioned kind.

According to the invention this object is solved in that during the course of a method of the aforementioned kind the wall of the gas pocket or gas pockets is pressure-loaded externally over the full surface area and the hollow board to be shaped is heated while such a full surface area pressure loading of the wall of the gas pocket or gas pockets is carried out. As a result of the full surface area pressure loading, a pressure is exerted externally onto the wall of the gas pocket or gas pockets which counteracts the inner pressure increasing within the gas pocket or gas pockets as a result of heating of the hollow board. Accordingly, the aforementioned wall is force-loaded on its inner side as well as on its outer side and, for a technically proper adjustment of the external pressure to the inner pressure resulting from heating of the gas pocket or gas pockets, the wall is protected from undesirable deformation and damage. In an ideal situation, the inner pressure of the gas pocket or gas pockets as well as the externally applied pressure coincide at any time during the heating and shaping process. It can therefore be expedient to increase the pressure exerted externally onto the wall of the gas pocket or gas pockets with increasing heating of the hollow board.

In a preferred embodiment of the method according to the invention, the wall of the gas pocket or gas pockets is pressure-loaded externally at least over parts of the surface by means of a flowable pressure medium. By employing a flowable pressure medium the full surface area pressure loading of the wall of the gas pocket or gas pockets can be ensured particularly reliably. As a result of its flowability, such a pressure medium is particularly able to penetrate into the interior of the hollow boards to be shaped and to generate the desired external pressure on the walls of the gas pocket or gas pockets present therein. Moreover, when using a flowable pressure medium, contact between the wall of the gas pocket or gas pockets or the surface of the hollow board to be shaped and a pressure piston, which contact may otherwise possibly be required, can be avoided or at least limited. According to the invention, there is the possibility of supporting wall parts by means of abutments which are, for example, formed by contact surfaces on the device for performing the method according to the invention and of loading, at the same time, other wall parts by means of the flowable pressure medium. It is also possible according to the invention to load the full surface area of the wall of the gas pocket or gas pockets externally by means of the flowable pressure medium.

In a further preferred embodiment of the method according to the invention, a flowable pressure medium is used whose temperature surpasses the initial temperature of the hollow board to be shaped. As a result of this measure, it is possible to employ the pressure medium not only for generating the external pressure required for the protection of the gas pocket or gas pockets but, moreover, to utilize it for heating the hollow board.

In the context of the method according to the invention, it is basically possible to employ any flowable pressure medium, in particular, any gaseous pressure medium or any pressure liquid. The flowable pressure medium preferred according to the invention is pressurized steam or heated pressure oil.

An advantageous variant of the method according to the invention for shaping hollow boards with two spaced apart cover layers and at least one gas pocket arranged between the cover layers at a spacing from their edges is characterized in that the edges of the cover layers are compressed in a substantially seal-tight way with formation of at least one cavity adjoining externally the wall of the gas pocket or gas pockets and in that the hollow board is pressure-loaded from the exterior on at least one of the cover layers and is heated during such loading. As a result of the aforementioned measures of the method, a full surface area external pressure loading of the wall of the gas pocket or gas pockets can be achieved by an active pressure loading of only at least one of the cover layers of the hollow board. The cavity or cavities in the interior of the hollow board, which are the result of the afore described pressing of the board edges, contain a medium, preferably air, which corresponds with respect to its thermal expansion behavior to the contents of the gas pocket or gas pockets, in particular, air contained therein. Accordingly, the contents of the cavity or cavities will expand by the same amount as the contents of the gas pocket or gas pockets of the hollow board. The resulting inner pressure of the cavity then provides in the form of an external gas pocket pressure the support of the wall of the gas pocket or gas pockets.

In a preferred embodiment of the method according to the invention, it is suggested that at least one of the cover layers of the hollow board is loaded externally by a flowable pressure medium.

For explaining the invention the following Figures are provided.

FIG. 1 show schematically a perspective view of a hollow board 1 of polypropylene, as it is used, for example, for producing packaging containers or the trunk bottom plates of motor vehicles. The hollow board 1 is of a three-layer configuration. An intermediate layer 2 with cup-shaped projections 3 that are open downwardly is welded to the upper cover layer 4 and the lower cover layer 5. The cup-shaped projections 3 are arranged at a spacing to one another and form by means of the walls 6 gas pockets that contain air and are gas-tightly sealed relative to the exterior of the hollow board 1. A part of the walls 6 is formed by the lower cover layer 5.

In the context of the method illustrated with the aid of FIG. 1, the hollow board 1 is introduced into a pressure chamber for shaping, into which chamber pressurized steam is then introduced as a flowable pressure medium. The steam surrounds the hollow board 1 at the exterior sides of the upper cover layer 4 as well as of the lower cover layer 5 and, moreover, flows—as illustrated in FIG. 1 by an arrow—into the intermediate spaces remaining between the cup-shaped projections 3 of the intermediate layer 2. Overall, a full surface area external pressure loading of the walls 6 of the cup-shaped projections 3 by steam is provided. This external pressure counteracts the increase of the inner pressure of the cup-shaped projections 3 resulting from the heating of the hollow board 1 by the steam, and has the effect that the cup-shaped projections 3 maintain their illustrated shape without them undergoing undesirable deformation or even bursting.

Figure 2:
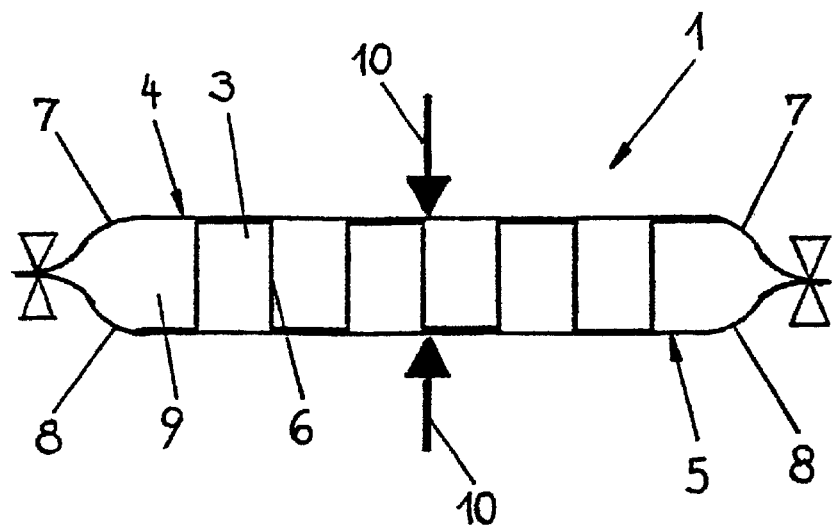

The second method variant will be explained with the aid of FIG. 2. This illustration shows schematically a hollow board 1 of the kind illustrated in FIG. 1 in a plan view onto its end face.

With heating, the circumferential edges 7, 8 of the upper cover layer 4 as well as of the lower cover layer 5 are tightly pressed against one another over the entire circumference of the hollow board 1. Accordingly, in the interior of the hollow board 1 a contiguous cavity 9, which is air-filled and which directly adjoins the walls 6 of the cup-shaped projections 3, is formed which is closed off in an air-tight way relative to the exterior of the hollow board 1. With the cavity 9 being sealed in this way, the hollow board 1 is loaded externally on its cover layers 4, 5 in a pressure chamber with pressurized steam. The pressure which is exerted by the steam onto the hollow board 1 is illustrated by the arrows 10 in FIG. 2. As a result of the heating of the hollow board 1 by the steam, the air in the interior of the cup-shaped projections 3 as well as the air in the interior of the cavity 9 will expand by the same amount. On the vertical parts of the walls of the cup-shaped projections 3, the inner pressure and the outer pressure of the cup-shaped projections 3 will thus be in equilibrium. A deformation of the walls 6 of the cup-shaped projections 3 in the radial direction is thus prevented. A deformation of parts of the walls 6 delimiting the cylindrical cup-shaped projections 3 in the axial direction is prevented by means of the pressure exerted by the steam onto the upper cover layer 4 as well as the lower cover layer 5 of the hollow board 1 which counteracts the increasing inner pressure of the cup-shaped projections 3. Overall, a full surface area pressure loading of the walls 6 of the cup-shaped projections 3 from the exterior is thus realized also by the method of FIG. 2.

The actual shaping of the hollow board 1 in the case of both methods described above is initiated, for example, by means of a pressure piston as soon as the hollow board 1 has been softened by heating by means of the steam to a sufficient degree. After the shaping process, the obtained shaped part is stabilized by cooling before it can be removed from the pressure chamber or ejected therefrom. The full surface area external pressure loading of the walls 6 of the cup-shaped projections 3 is maintained as long as the risk of a temperature-caused or inner pressure-caused deformation or damage of the walls 6 is still present.

What is claimied is:

1. Method for shaping hollow boards (1) of thermoplastic material, which comprise at least one gas pocket (3) with a wall 6, wherein the hollow board (1) to be shaped is heated, wherein the wall (6) of the gas pocket or gas pockets (3) is subjected to full surface area pressure loading and in that the hollow board (1) to be shaped is heated while such a full surface area pressure loading of the wall (6) of the gas pocket or gas pockets (3) is performed.

2. Method according to claim 1, wherein the wall (6) of the gas pocket or gas pockets (3) is pressure-loaded externally at least over a part of the surface area by a flowable pressure medium.

3. Method according to claim 1, wherein a flowable pressure medium is used whose temperature surpasses the initial temperature of the hollow board to be shaped.

4. Method according to claim 1, wherein a gaseous pressure medium, in particular, pressurized steam, is used as a flowable pressure medium.

5. Method according to claim 1, wherein a pressure liquid, in particular, heated pressure oil, is used as a flowable pressure medium.

6. Method according to claim 1, wherein the hollow boards (1) are comprised of two spaced apart cover layers (4, 5) and at least one gas pocket (3) arranged between the cover layers (4, 5) at a spacing from their edges, wherein the cover layers (4, 5) at their edges (7, 8) are pressed substantially tightly against one another with formation of at least one cavity (9) externally adjoining the wall 6) of the gas pocket or gas pockets (3) and in that the hollow board (1) is pressure-loaded from the exterior on at least one of the cover layers (4, 5) and is heated while such pressure loading is performed.

7. Method according to claim 1, wherein at least one of the cover layers (4, 5) of the hollow board (1) is loaded from the exterior with a flowable pressure medium.

* * * * *